(12) United States Patent
Storey et al.

(10) Patent No.: US 8,376,034 B2
(45) Date of Patent: Feb. 19, 2013

(54) RADIANT COOLERS AND METHODS FOR ASSEMBLING SAME

(75) Inventors: James Michael Storey, Houston, TX (US); Aaron John Avagliano, Houston, TX (US); Ashley Nicole Gerbode, Houston, TX (US); John Battaglioli, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 1030 days.

(21) Appl. No.: 11/862,021

(22) Filed: Sep. 26, 2007

(65) Prior Publication Data
US 2009/0078397 A1 Mar. 26, 2009

(51) Int. Cl.
*F28D 7/00* (2006.01)
*B01J 19/00* (2006.01)
*C10J 3/76* (2006.01)
*F22B 1/02* (2006.01)

(52) U.S. Cl. .............. 165/162; 165/910; 48/67; 122/32; 122/33; 422/198

(58) Field of Classification Search .................. 165/910, 165/162; 422/198; 48/67; 122/32, 33
See application file for complete search history.

(56) References Cited

U.S. PATENT DOCUMENTS

| | | | | |
|---|---|---|---|---|
| 1,774,136 A | * | 8/1930 | Forssblad | 122/235.12 |
| 2,570,073 A | * | 10/1951 | Reintjes | 122/235.12 |
| 2,610,832 A | * | 9/1952 | Holmes et al. | 165/69 |
| 2,804,284 A | * | 8/1957 | Otten | 165/166 |
| 3,830,623 A | | 8/1974 | Christiansen | |
| 3,850,453 A | | 11/1974 | Bentley et al. | |
| 4,045,285 A | | 8/1977 | Baumgaertner et al. | |
| 4,236,576 A | | 12/1980 | Deuse et al. | |
| 4,265,301 A | * | 5/1981 | Anderson | 165/162 |
| 4,299,273 A | * | 11/1981 | Fischli | 165/78 |
| 4,332,293 A | | 6/1982 | Hiramatsu | |
| 4,372,253 A | * | 2/1983 | Hibbel et al. | 122/7 R |
| 4,395,268 A | * | 7/1983 | Zabelka | 48/67 |
| 4,451,960 A | | 6/1984 | Molitor | |
| 4,456,058 A | * | 6/1984 | Powell | 165/154 |

(Continued)

FOREIGN PATENT DOCUMENTS

| | | |
|---|---|---|
| EP | 0048326 A2 | 3/1982 |
| EP | 0223534 A2 | 5/1987 |

(Continued)

OTHER PUBLICATIONS

International Search Report, PCT/US2008/070056, dated Oct. 15, 2008, 4 pages.

*Primary Examiner* — Brandon M Rosati
(74) *Attorney, Agent, or Firm* — Armstrong Teasdale LLP

(57) ABSTRACT

A method of assembling a radiant cooler includes providing a vessel shell that defines a gas flow passage therein that extends generally axially through the vessel shell, forming a tube cage from coupling a plurality of cooling tubes together to form a tube cage defined by a plurality of chevron-shaped projections that extend circumferentially about a center axis of the tube cage, each chevron-shaped projection includes a first side and a second side coupled together a tip, circumferentially-adjacent pairs of projections coupled together such that a valley is defined between each pair of circumferentially-spaced projections, each of the projection tips is positioned radially outward from each of the valleys, and orienting the tube cage within the vessel shell such that the tube cage is in flow communication with the flow passage.

17 Claims, 3 Drawing Sheets

U.S. PATENT DOCUMENTS

| | | | | |
|---|---|---|---|---|
| 4,479,355 A | * | 10/1984 | Guide et al. | 60/683 |
| 4,509,463 A | * | 4/1985 | Vollhardt et al. | 122/7 R |
| 4,513,694 A | * | 4/1985 | Wiemer | 122/7 R |
| 4,538,676 A | * | 9/1985 | Premel et al. | 165/145 |
| 4,841,917 A | | 6/1989 | Premel | |
| 5,099,916 A | | 3/1992 | Vollhardt | |
| 5,107,683 A | | 4/1992 | Chan et al. | |
| 5,233,943 A | | 8/1993 | Martin et al. | |
| 5,251,692 A | | 10/1993 | Haussmann | |
| 5,251,693 A | * | 10/1993 | Zifferer | 165/160 |
| 5,271,809 A | | 12/1993 | Holzhausen | |
| 5,277,247 A | * | 1/1994 | Cameron | 165/159 |
| 5,449,037 A | * | 9/1995 | Welkey | 165/162 |
| 5,697,435 A | | 12/1997 | Stickford, Jr. et al. | |
| 5,806,585 A | | 9/1998 | Yoshida et al. | |
| 6,269,782 B1 | * | 8/2001 | Kayahara et al. | 122/235.11 |
| 7,749,290 B2 | * | 7/2010 | Wallace | 48/89 |
| 2003/0005634 A1 | | 1/2003 | Calderon et al. | |
| 2004/0108098 A1 | * | 6/2004 | Sanders | 165/46 |
| 2007/0028860 A1 | * | 2/2007 | Hemsath | 123/3 |
| 2007/0119577 A1 | * | 5/2007 | Kraft et al. | 165/157 |
| 2009/0025917 A1 | * | 1/2009 | Gauthier et al. | 165/157 |

FOREIGN PATENT DOCUMENTS

| | | |
|---|---|---|
| EP | 0536134 B1 | 7/1994 |
| WO | 2005005040 A1 | 1/2005 |

\* cited by examiner

RADIANT COOLERS AND METHODS FOR ASSEMBLING SAME

BACKGROUND OF THE INVENTION

This invention relates generally to gasification systems, and more specifically to a radiant cooler.

At least some known gasification systems are integrated with at least one power-producing turbine system. For example, at least some known gasifiers convert a mixture of fuel, air or oxygen, and/or steam into an output of partially combusted gas, sometimes referred to as "syngas." The hot syngas may be supplied to a combustor of a gas turbine engine, which powers a generator that supplies electrical power to a power grid. Exhaust from at least some known gas turbine engines is supplied to a heat recovery steam generator that generates steam for driving a steam turbine. Power generated by the steam turbine also drives an electrical generator that provides electrical power to the power grid.

At least some known gasification systems use a separate gasifier that, in combination with the syngas cooler, facilitates gasifying feedstocks, recovering heat, and removing solids from the syngas to make the syngas more useable by other systems. Further, at least some known syngas coolers include a plurality of platens and a tube wall that defines a heat exchange surface area that facilitates transferring heat from the flow of syngas to a heat transfer fluid channeled within each platen and/or the tube wall. The plurality of platens in such syngas coolers are substantially circumscribed by the tube wall, which is further surrounded by a cooler vessel shell. Known tube walls are designed to be gas-tight to retain syngas within the tube wall such that syngas contacts the tube wall rather than the cooler vessel shell.

At least some known syngas coolers include a plurality of downcomers that extend generally axially within a space defined by the tube wall and the vessel shell. As a result, the diameter of the vessel shell of such coolers is sized to accommodate the tube wall and the plurality of downcomers. The vessel shell diameter is proportional to the cost of the syngas cooler and the heat exchange surface area of the tube wall. As such, reducing the vessel shell diameter reduces an overall size and cost of the syngas cooler, however, the heat exchange surface area of the tube wall is also facilitated to be reduced as a result.

BRIEF DESCRIPTION OF THE INVENTION

In one aspect, a method of assembling a radiant cooler is provided. The method includes providing a vessel shell that defines a gas flow passage therein that extends generally axially through the vessel shell, forming a tube cage from coupling a plurality of cooling tubes together to form a tube cage defined by a plurality of chevron-shaped projections that extend circumferentially about a center axis of the tube cage, each chevron-shaped projection includes a first side and a second side coupled together a tip, circumferentially-adjacent pairs of projections coupled together such that a valley is defined between each pair of circumferentially-spaced projections, each of the projection tips is positioned radially outward from each of the valleys, and orienting the tube cage within the vessel shell such that the tube cage is in flow communication with the flow passage.

In another aspect, a tube cage for use in a syngas cooler is provided. The tube cage includes a plurality of cooling tubes that are coupled together to define a plurality of chevron-shaped projections, the plurality of cooling tubes extend circumferentially about a center axis, each chevron-shaped projection includes a first side and a second side coupled together a tip, circumferentially-adjacent pairs of projections coupled together such that a valley is defined between each pair of circumferentially-spaced projections, each of the projection tips is positioned radially outward from each of the valleys In a further aspect, a radiant cooler is provided. The radiant cooler includes a vessel shell circumferentially-positioned about a center axis at a shell radius, and a tube cage comprising a plurality of cooling tubes that are coupled together to define a plurality of chevron-shaped projections, the plurality of cooling tubes extend circumferentially about a center axis of the tube cage, each chevron-shaped projection includes a first and second side coupled together at a tip, circumferentially-adjacent pairs of projections coupled together such that a valley is defined between each pair of circumferentially-spaced projections.

DETAILED DESCRIPTION OF THE INVENTION

The present invention generally provides exemplary syngas coolers to facilitate cooling syngas in an integrated gasification combined-cycle (IGCC) power generation system. The embodiments described herein are not limiting, but rather are exemplary only. It should be understood that the present invention may apply to any gasification system that includes a radiant cooler.

Figure 1:
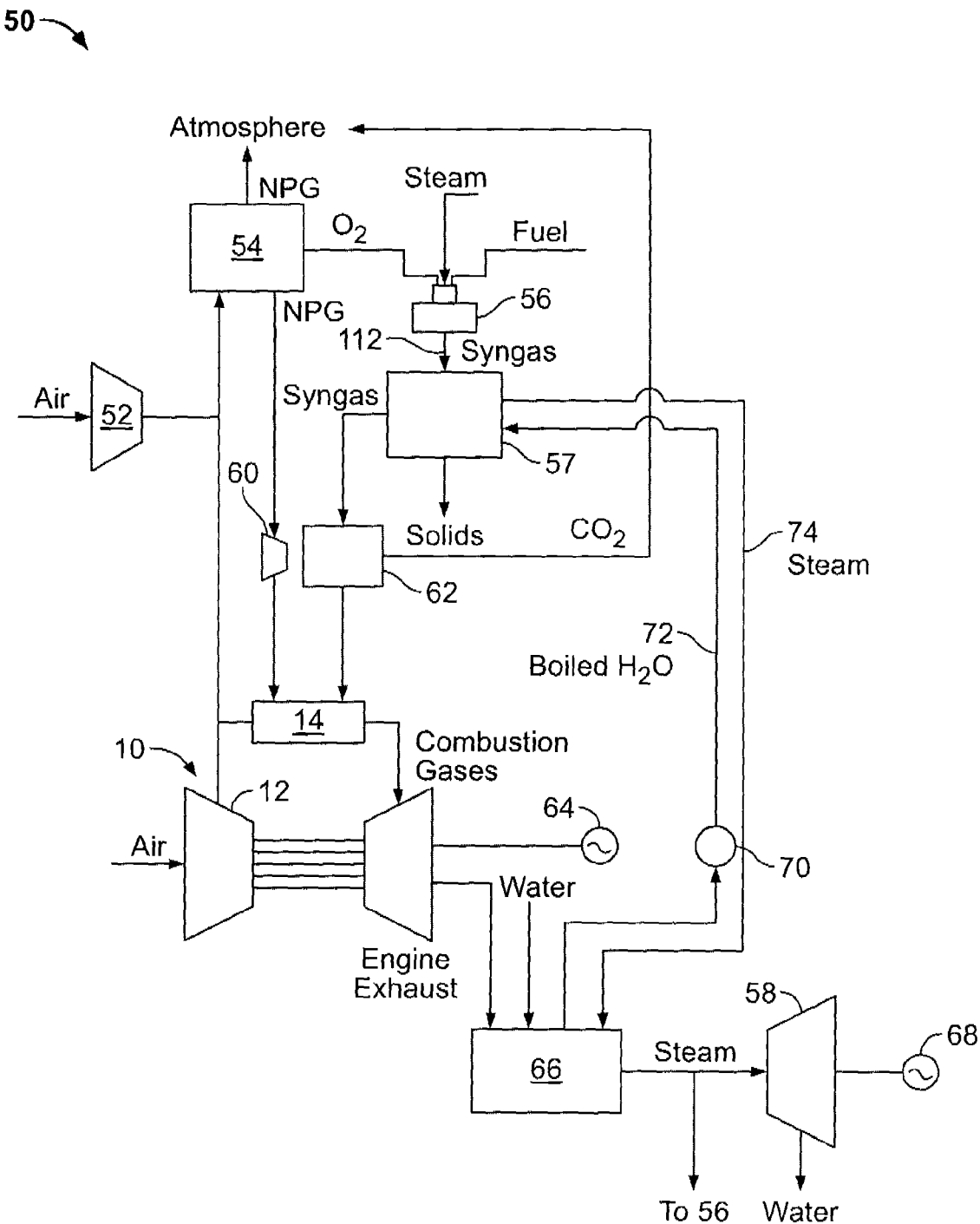
FIG. 1 is a schematic diagram of an exemplary integrated gasification combined-cycle (IGCC) power generation system.

FIG. 1 is a schematic diagram of an exemplary IGCC power generation system 50. IGCC system 50 generally includes a main air compressor 52, an air separation unit 54 coupled in flow communication to compressor 52, a gasifier 56 coupled in flow communication to air separation unit 54, a syngas cooler 57 coupled in flow communication to gasifier 56, a gas turbine engine 10 coupled in flow communication to syngas cooler 57, and a steam turbine 58.

In operation, compressor 52 compresses ambient air that is channeled to air separation unit 54. In some embodiments, in addition to compressor 52 or alternatively, compressed air from a gas turbine engine compressor 12 is supplied to air separation unit 54. Air separation unit 54 uses the compressed air to generate oxygen for use by gasifier 56. More specifically, air separation unit 54 separates the compressed air into separate flows of oxygen ($O_2$) and a gas by-product, sometimes referred to as a "process gas." The $O_2$ flow is channeled to gasifier 56 for use in generating partially combusted gases, referred to herein as "syngas," for use by gas turbine engine 10 as fuel, as described below in more detail. The process gas generated by air separation unit 54 includes nitrogen, referred to herein as "nitrogen process gas" (NPG). The NPG may also include other gases such as, but not limited to, oxygen and/or argon. For example, in some embodiments, the NPG includes between about 95% to about 100% nitrogen. In the exemplary embodiment, at least some of the NPG flow is vented to the atmosphere from air separation unit 54. Moreover, in the exemplary embodiment, some of the NPG flow is injected into a combustion zone (not shown) within gas turbine engine combustor 14 to facilitate controlling emissions of engine 10, and more specifically to facilitate reducing the combustion temperature and a nitrous oxide emissions of engine 10. In the exemplary embodiment, IGCC system 50 also includes a compressor 60 for compressing the NPG flow before injecting the NPG into combustor 14.

In the exemplary embodiment, gasifier 56 converts a mixture of fuel, $O_2$ supplied by air separation unit 54, steam, and/or limestone into an output of syngas 112 for use by gas turbine engine 10 as fuel. Although gasifier 56 may use any fuel, in the exemplary embodiment, gasifier 56 uses coal, petroleum coke, residual oil, oil emulsions, tar sands, and/or other similar fuels. Moreover, in the exemplary embodiment, syngas 112 generated by gasifier 56 includes carbon dioxide ($CO_2$).

Moreover, in the exemplary embodiment, syngas 112 generated by gasifier 56 is channeled to syngas cooler 57, which facilitates cooling syngas 112, as described in more detail below. Cooled syngas 112 is cleaned using a clean-up device 62 before syngas 112 is channeled to gas turbine engine combustor 14 for combustion thereof. In the exemplary embodiment, $CO_2$ may be separated from syngas 112 during cleaning and may be vented to the atmosphere, captured, and/or partially returned to gasifier 56. Gas turbine engine 10 drives a generator 64 that supplies electrical power to a power grid (not shown). Exhaust gases from gas turbine engine 10 are channeled to a heat recovery steam generator 66 that generates steam for driving steam turbine 58. Power generated by steam turbine 58 drives an electrical generator 68 that provides electrical power to the power grid. In the exemplary embodiment, steam from heat recovery steam generator 66 is also supplied to gasifier 56 as a moderator for generating syngas.

Furthermore, in the exemplary embodiment, system 50 includes a pump 70 that supplies feed water 72 from steam generator 66 to syngas cooler 57 to facilitate cooling syngas 112 channeled therein from gasifier 56. Feed water 72 is channeled through syngas cooler 57, wherein feed water 72 is converted to a steam 74, as described in more detail below. Steam 74 is then returned to steam generator 66 for use within gasifier 56, syngas cooler 57, and/or steam turbine 58, and/or other processes in system 50.

Figure 2:
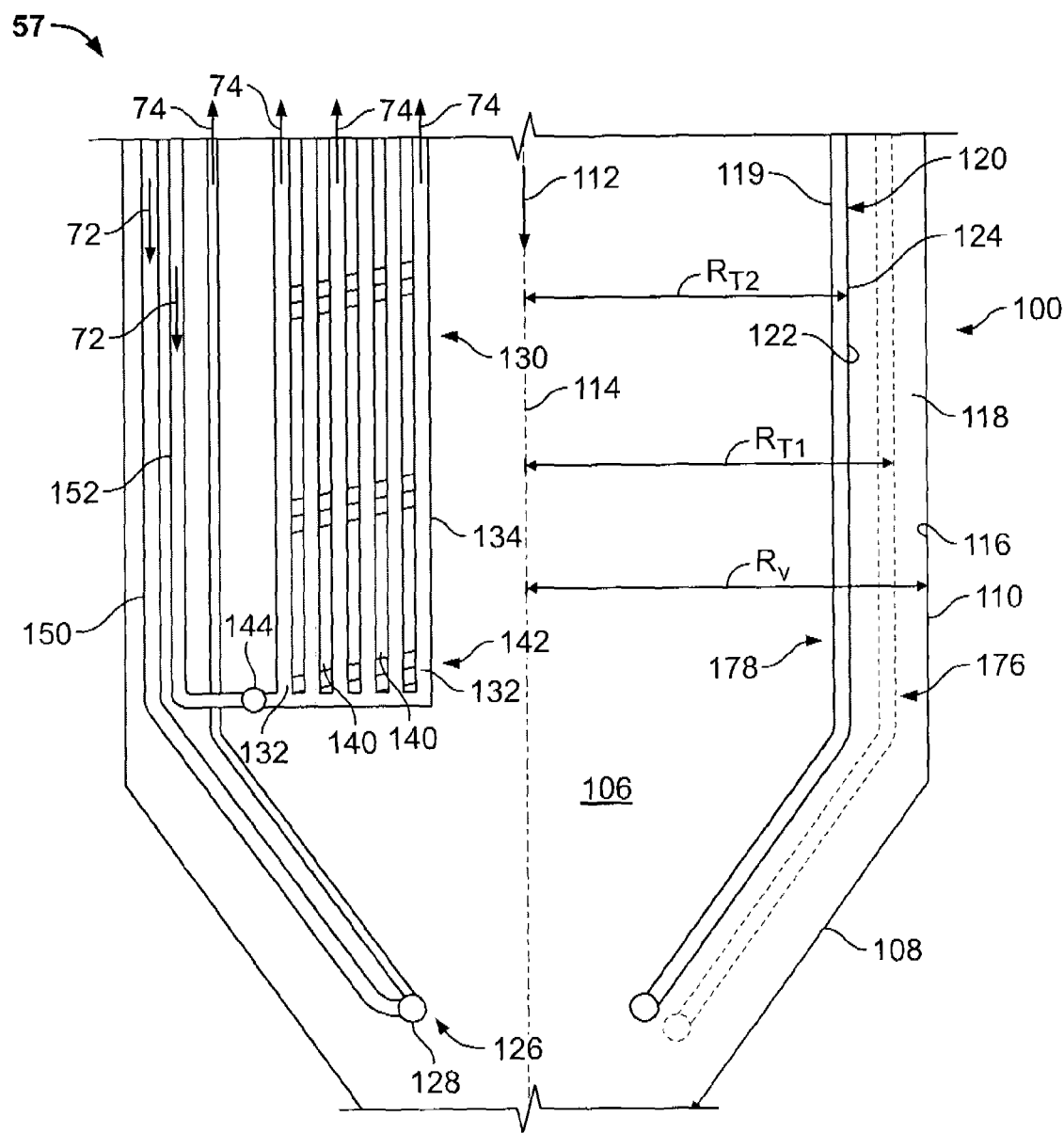
FIG. 2 is a schematic cross-sectional view of an exemplary syngas cooler that may be used with the power generation system shown in FIG. 1.
Figure 3:
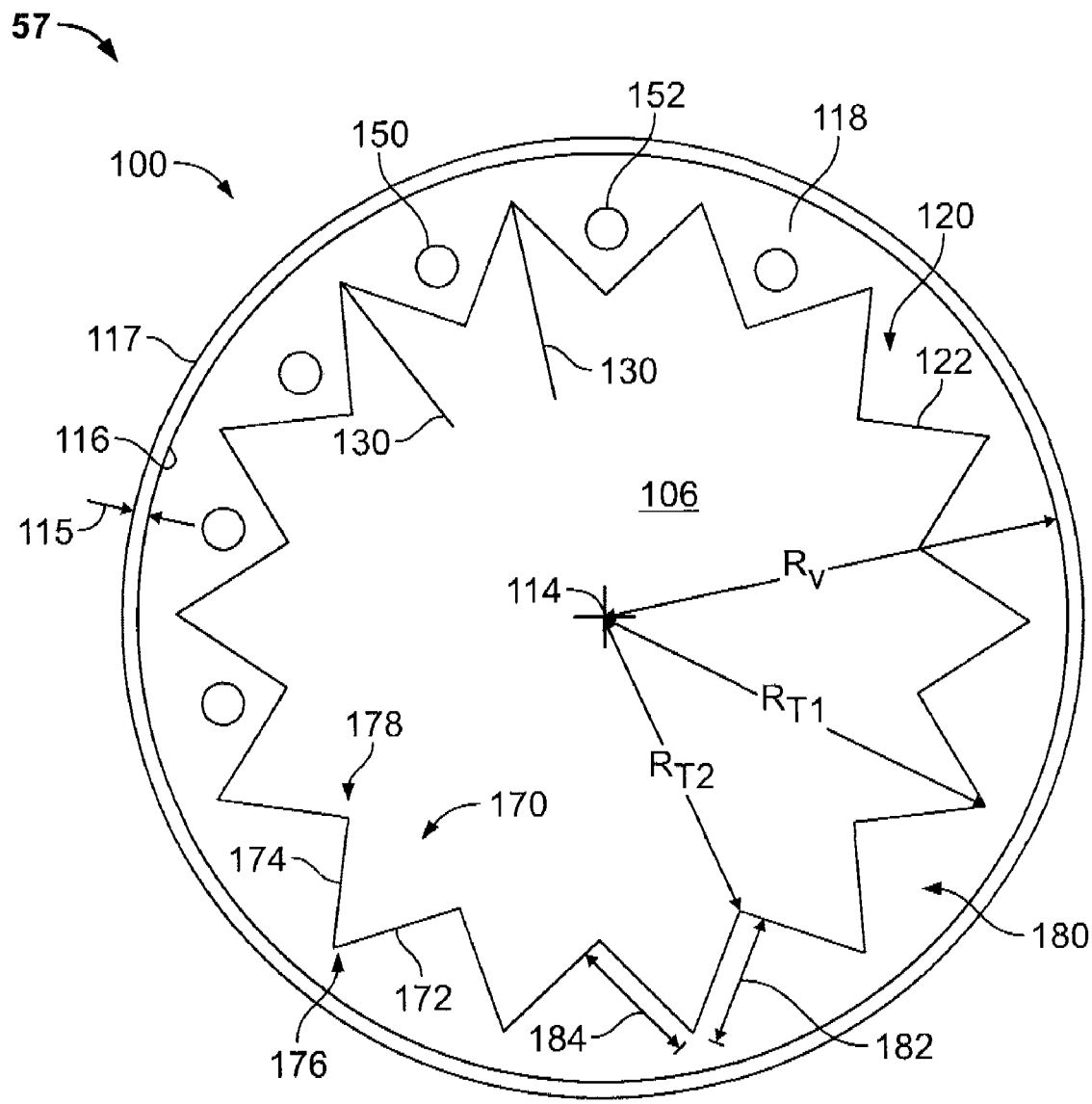
FIG. 3 is a cross-sectional plan-view of the syngas cooler shown in FIG. 2.

FIG. 2 is a schematic cross-sectional side-view of an exemplary syngas cooler 57 that may be used with a gasification system, such as IGCC system 50 (shown in FIG. 1). FIG. 3 is a cross-sectional plan-view of syngas cooler 57. In the exemplary embodiment, syngas cooler 57 is a radiant syngas cooler. Alternatively, syngas cooler 57 may be any syngas cooler that includes at least one cooling tube that functions, as described in more detail below. In the exemplary embodiment, syngas cooler 57 includes a pressure vessel shell 100 that includes an upper shell (not shown), a lower shell 108, and a vessel body 110 extending therebetween. In the exemplary embodiment, vessel shell 100 is substantially cylindrical and defines an inner chamber 106 within syngas cooler 57. Moreover, vessel shell 100 is fabricated from a pressure quality material, such as, but not limited to, a chromium molybdenum steel. The material used in fabricating shell 100 enables shell 100 to withstand the operating pressure of syngas 112 contained within syngas cooler 57. Moreover, in the exemplary embodiment, syngas cooler 57 has a vessel radius $R_V$ that extends from a center axis 114 to an inner surface 116 of vessel shell 100. Specifically, in the exemplary embodiment, vessel shell 100 has a thickness 115 measured between an outer surface 117 and inner surface 116. Thickness 115, in the exemplary embodiment, is proportional to vessel radius $R_V$ of shell 100. Specifically, as vessel radius $R_V$ is increased, thickness 115 is increased. Accordingly, such increases facilitate increasing the cost of syngas cooler 57.

In the exemplary embodiment, gasifier 56 (shown in FIG. 1) is coupled in flow communication with syngas cooler 57 such that syngas 112 discharged from gasifier 56 is channeled through an inlet (not shown) into syngas cooler 57, and more specifically, into inner chamber 106, as described in more detail below.

Syngas cooler 57, in the exemplary embodiment, also includes an annular membrane wall, or tube cage 120, that is coupled within chamber 106 and that extends generally axially within syngas cooler 57. Tube cage 120 is aligned substantially co-axially with center axis 114 and is formed with a plurality of water tubes, or cooling tubes 124, that each extend axially through a portion of syngas cooler 57. Tube cage 120, in the exemplary embodiment, includes a radially outer surface 122 and a radially inner surface 119. The inner surface 119 defines a heat exchange surface area (not shown) that facilitates cooling syngas 112, as is described in more detail below. In the exemplary embodiment, a gap 118 is defined between vessel shell inner surface 116 and the outer surface 122 of tube cage 120.

Each tube cage cooling tube 124 has an outer surface 122 and an opposite inner surface (not shown) that defines an inner passage (not shown) extending axially therethrough. More specifically, the inner passage of each tube cage cooling tube 124 enables cooling fluid to be channeled therethrough. In the exemplary embodiment, the cooling fluid channeled within each tube cage cooling tube 124 is feed water 72. Alternatively, the cooling fluid channeled within each tube cage cooling tube 124 may be any cooling fluid that is suitable for use in a radiant cooler. Moreover, in the exemplary embodiment, at least one pair of adjacent circumferentially-spaced apart cooling tubes 124 are coupled together using a web portion (not shown). In the exemplary embodiment, tube cage cooling tubes 124 are fabricated from a material that facilitates heat transfer. Specifically, a downstream end 126 of each cooling tube 124 is coupled in flow communication to an inlet manifold 128. Similarly, in the exemplary embodiment, an upstream end (not shown) of each tube cage cooling tube 124 is coupled in flow communication to a tube cage riser (not shown).

In the exemplary embodiment, gap 118 is pressurized to facilitate preventing syngas 112 from entering space 118. Specifically, gap 118 is pressurized with nitrogen using a pressurization system (not shown). In the exemplary embodiment, the pressurization system maintains the pressure within gap 118 to be approximately equal to the operating pressure contained within chamber 106. Alternatively, the pressurization system maintains the pressure within gap 118 at a pressure that is higher than the pressure within chamber 106. As a result, the pressure within gap 118 prevents syngas 112, discharged from tube cage 120, from entering space 118. In some known syngas coolers, the tube cage may not withstand a pressure differential between the annular space and the tube cage chamber of more than about 15 pounds per square inch ("psi") to about 25 psi. As described below in more detail, in some known tube cages, if the pressure within gap 118 is substantially greater than, or is substantially less than, the pressure with chamber 106, tube cage 120 may buckle or rupture. As a result, controlling the pressure within gap 118 also facilitates preventing buckling or rupturing of tube cage 120.

Tube cage 120, in the exemplary embodiment, is formed with a plurality of circumferentially-spaced chevron-shaped sections, or chevrons 170. Specifically, in the exemplary embodiment, tube cage 120 includes fourteen chevrons 170.

As a result, tube cage 120 has a substantially star-shaped cross-section. Alternatively, tube cage 120 may be formed with any number of chevrons 170. In the exemplary embodiment, each chevron 170 includes a first side wall 172 and an opposite second side wall 174. Each of the first and second side walls 172 and 174 includes at least one tube cage cooling tube 124, and the first and second side walls 172 and 174 are coupled together at a radially outer point, or chevron tip 176. Moreover, in the exemplary embodiment, at least two adjacent circumferentially-spaced apart chevrons 170 are coupled together such that a radially inner most point, or chevron valley 178, is defined between the chevrons 170. Specifically, each chevron tip 176 is circumferentially-positioned between a pair of adjacent chevron valleys 178. As a result, each chevron valley 178 defines a flute 180 that extends generally axially along tube cage 120.

Each chevron tip 176, in the exemplary embodiment, is formed with a first radius $R_{T1}$ and each chevron valley 178 is formed with a second radius $R_{T2}$. First radius $R_{T1}$ and second radius $R_{T2}$ each extend from center axis 114 to each respective chevron tip 176 and chevron valley 178. In the exemplary embodiment, first radius $R_{T1}$ is longer than second radius $R_{T2}$, however, first and second radii $R_{T1}$ and $R_{T2}$ are each shorter than vessel radius $R_V$. The difference in the lengths of radii $R_{T1}$ and $R_V$ ensures that gap 118 is defined between inner surface 116 of vessel shell 100 and radially outer surface 122.

In the exemplary embodiment, each chevron tip 176 and chevron valley 178 includes at least one cooling tube 124. Alternatively, either chevron tip 176 and/or chevron valley 178 may include a plurality of cooling tubes 124. In such an embodiment, chevron tip 176 and/or chevron valley 178 is sized to extend generally circumferentially between first side wall 172 and second side wall 174. In the exemplary embodiment, first and second side walls 172 and 174 extend substantially linearly from chevron tip 176 to chevron valley 178. In an alternative embodiment, at least one of first side wall 172 and/or second side wall 174 extends arcuately from chevron tip 176 to chevron valley 178. In another alternative embodiment, at least one of first side wall 172 and/or second side wall 174 extends in a generally sinusoidal patter. In the exemplary embodiment, a length 182 of each first side wall 172 is approximately equal to a length 184 of each second side wall 174, such that chevron 170 is substantially symmetrical, about a centerline (not shown) bisecting each chevron 170. Alternatively, first side wall length 182 is different than second side wall length 184 such that chevron 170 is asymmetrical.

Syngas cooler 57 includes at least one heat transfer panel, or platen 130, that extends generally radially from tube cage 120 towards center axis 114. Alternatively, each platen 130 may extend away from tube cage 120 at a generally oblique angle. Specifically, in the exemplary embodiment, at least one platen 130 extends generally radially from chevron tip 176 towards center axis 114. Alternatively, at least one platen 130 extends generally radially from any point defined on tube cage 120 towards center axis 114, wherein at least one platen 130 has a radial length that is different than a radial length of at least one other platen 130. In the exemplary embodiment, each platen 130 includes a plurality of cooling tubes 132 that extend generally axially through syngas cooler 57. Each platen cooling tube 132 includes an outer surface 134 and an inner surface (not shown) that defines an inner passage (not shown) that extends axially through platen cooling tube 132.

In the exemplary embodiment, at least one pair of adjacent, radially-spaced apart platen cooling tubes 132 are coupled together using a web portion 140 to form each platen 130. Moreover, in the exemplary embodiment, platen cooling tubes 132 are fabricated from a material that facilitates heat transfer. Moreover, each platen cooling tube 132, in the exemplary embodiment, includes a downstream end 142 that is coupled in flow communication with a platen inlet manifold 144. Similarly, in the exemplary embodiment, an upstream end (not shown) of each platen cooling tube 132 is coupled in flow communication to a platen riser (not shown).

In the exemplary embodiment, syngas cooler 57 also includes a plurality of tube cage downcomers 150 and a plurality of platen downcomers 152 that each extend generally axially within space 118. Specifically, downcomers 150 and 152 each include an inner surface (not shown) that defines an inner passage (not shown) that extends generally axially through each downcomer 150 and 152. More specifically, each tube cage downcomer 150 is coupled in flow communication with tube cage inlet manifold 128, and each platen downcomer 152 is coupled in flow communication with platen inlet manifold 144.

Tube cage 120, in the exemplary embodiment, as described above, has a substantially star-shaped cross-section that facilitates reducing the vessel radius $R_V$ of vessel shell 100, with respect to known syngas coolers. Specifically, in the exemplary embodiment, each chevron tip 176 is formed with first radius $R_{T1}$ that is approximately equal to a radius of known syngas tube cages. Moreover, in the exemplary embodiment, each chevron valley 178 is formed with second radius $R_{T2}$ that is smaller than the radius of known tube cages, wherein each chevron valley 178 defines a respective flute 180. Flutes 180, in the exemplary embodiment, facilitate positioning downcomers 150 and 152 closer to center axis 114, as compared to the positions of downcomers within known syngas coolers. Specifically, in the exemplary embodiment, at least one downcomer 150 and/or 152 is positioned within flute 180. As a result, the radius $R_V$ of shell 100 is reduced in comparison to known vessel shell radii. Moreover, reducing the radius $R_V$ of shell 100 facilitates a reduction in the size, thickness 115, and manufacturing costs of syngas cooler 57.

Reducing the vessel radius of known syngas coolers causes an undesirable reduction in the heat exchange surface area. However, in the exemplary embodiment, chevrons 170 facilitate reducing the radius $R_V$ of shell 100 by positioning at least one of downcomers 150 and/or 152 within flute 180 without causing a reduction in the heat exchange surface area of tube cage 120. Specifically, increasing the lengths 182 and 184 of respective first and second side walls 172 and 174 facilitates reducing the radius $R_V$ of shell 100 without reducing the heat exchange surface area of tube cage 120. As a result, at least one of downcomers 150 and/or 152 is positioned within at least one flute 180, adjacent to center axis 114, thus facilitating a reduction in the radius $R_V$ of shell 100 without reducing the heat exchange surface area of tube cage 120. Thus, the overall size and fabrication costs of syngas cooler 57 are facilitated to be reduced without reducing the heat exchange surface area of tube cage 120.

In the exemplary embodiment, chevrons 170 also facilitate increasing the radial buckling strength of tube cage 120. Specifically, in the event that the pressure within gap 118 is either substantially greater than, or substantially less than, the operating pressure within chamber 106, chevrons 170 facilitate preventing buckling and/or rupture. More specifically, each first and second side wall 172 and 174 extend generally radially from chevron tip 176 to chevron valley 178, such that the moment of inertia, in a radial bending direction of tube cage 120 is increased. As a result, tube cage 120 is more resistant to buckling and/or rupturing than known syngas coolers that do not include a plurality of chevrons 170 oriented in a substantially star-shaped cross-sectional profile.

During operation, syngas 112 is discharged from gasifier 56 into chamber 106 through the syngas cooler inlet, and more specifically, into tube cage 120. In the exemplary embodiment, each platen 130 extends generally radially outward from each chevron tip 176 towards center axis 114. Syngas 112 discharged from gasifier 56 increases the operating pressure within chamber 106. The pressurization system pressurizes gap 118 such that the operating pressure within gap 118 is approximately equal to, or greater than, the pressure within chamber 106. As a result, gap 118 and the pressurization system facilitate preventing buckling or rupture of tube cage 120.

Moreover, during operation, in the exemplary embodiment, syngas 112 is channeled over the heat exchange surface area defined by inner surface 119 and at least one platen 130. The flow of syngas 112 over the heat exchange surface area and at least one platen 130 facilitates transferring heat from the flow of syngas 112 to the flow of feed water 72 channeled though cooling tubes 124 and 132. Chevrons 170 facilitate increasing the heat exchange surface area of tube cage 120, and enable at least one of downcomers 150 and/or 152 to be positioned closer to center axis 114 as compared to known syngas coolers. Specifically, in the exemplary embodiment, at least one of downcomers 150 and/or 152 is positioned within at least one flute 180 in a relative location that is closer to center axis 114 than downcomers that are positioned in known syngas coolers. As a result, in the exemplary embodiment, chevrons 170 facilitate reducing the vessel radius $R_V$, and more specifically reducing the cost of syngas cooler 57, without reducing the heat exchange surface area.

As described above, in the exemplary embodiment, a plurality of chevrons 170 form tube cage 120 that has a generally star-shaped cross-sectional profile that facilitates reducing vessel radius $R_V$ without reducing the heat exchange surface area of tube cage 120. Specifically, in the exemplary embodiment, each pair of adjacent circumferentially-spaced apart chevrons 170 defines a flute 180 therebetween. Each flute 180 facilitates positioning at least one of downcomers 150 and 152 therein such that at least one of downcomers 150 and/or 152 is positioned closer to center axis 114 than is possible with known syngas coolers. Moreover, increasing the lengths 182 and 184 of first and second side walls 172 and 174, respectively, facilitates increasing the heat exchange surface area within tube cage 120. As a result, in the exemplary embodiment, the vessel radius $R_V$ is facilitated to be reduced, without a reduction in the amount of the heat exchange surface area of tube cage 120. Moreover, as described above, reducing the vessel radius $R_V$ facilitates reducing the thickness 115 of shell 100 which further facilitates reducing the fabrication costs of syngas cooler 57.

The above-described methods and apparatus facilitate reducing the fabrication costs and size of a syngas cooler without reducing the amount of heat exchange surface area defined by a tube cage coupled within the syngas cooler. The tube cage includes a plurality of circumferentially-spaced apart chevron-shaped sections, such that the tube cage has a substantially star-shaped cross-sectional profile. A flute is defined between a pair of circumferentially-spaced apart chevrons, wherein the flute extends generally axially along the tube cage. A plurality of downcomers extends generally axially within a gap defined between the vessel and the tube cage. At least one downcomer is positioned within the flute such that the at least one downcomer is positioned closer to a center axis of the syngas cooler as compared to the positions of downcomers within known syngas cooler. Moreover, the chevrons facilitate increasing a buckling strength of the tube cage by increasing a moment of inertia in a generally radial bending direction. Furthermore, the chevrons also facilitate increasing the heat exchange surface area of the tube cage. As a result, the chevrons facilitate reducing the vessel radius without reducing the heat exchange surface area of the tube cage, and increasing the buckling strength of the tube cage. Thus, the chevrons facilitate reducing the size and fabrication costs of the syngas cooler without reducing the heat exchange surface area of the tube cage.

Exemplary embodiments of tube cages including at least one chevron are described in detail above. The tube cage is not limited to use with the syngas cooler described herein, but rather, the tube cage can be utilized independently and separately from other syngas cooler components described herein. Moreover, the invention is not limited to the embodiments of the tube cages described above in detail. Rather, other variations of the tube cages may be utilized within the spirit and scope of the claims.

While the invention has been described in terms of various specific embodiments, those skilled in the art will recognize that the invention can be practiced with modification within the spirit and scope of the claims.

What is claimed is:

1. A method of assembling a radiant cooler, said method comprising:
   providing a vessel shell that defines a gas flow passage therein that extends generally axially through the vessel shell;
   forming a tube cage including a plurality of cooling tubes defining a plurality of chevron-shaped projections that are coupled together continuously to each said circumferentially-adjacent projection, the plurality of chevron-shaped projections extending circumferentially about a center axis of the tube cage, each chevron-shaped projection including a first side and a second side coupled together at a tip, circumferentially-adjacent pairs of projections coupled together such that a valley is defined between each pair of circumferentially-spaced projections, each of the projection tips being positioned radially outward from each of the valleys;
   positioning at least one heat transfer panel within said tube cage, such that said at least one heat transfer panel extends radially inwardly from a tip of one of said chevron-shaped projections towards said center axis;
   coupling at least one downcomer in one valley radially outwardly of the tube cage, such that the at least one downcomer extends generally axially between the first side and the second side of one circumferentially-spaced projection; and
   orienting the tube cage within the vessel shell such that the tube cage is in flow communication with the flow passage.

2. A method in accordance with claim 1 wherein forming a tube cage further comprises defining a tip with at least one cooling tube, and defining a valley with at least one cooling tube.

3. A method in accordance with claim 1 wherein forming a tube cage further comprises aligning the plurality of tubes at least one of linearly, sinusoidally, and arcuately from each of the tips to each of the valleys.

4. A method in accordance with claim 1 wherein forming a tube cage further comprises aligning the plurality of cooling tubes such that each first side has a first length and each second side has a second length that is substantially equivalent to the first length.

5. A method in accordance with claim 1 wherein forming a tube cage further comprises aligning the plurality of cooling tubes such that each first side has a first length and each second side has a second length that is different than the first length.

6. A tube structure for use in a syngas cooler, said tube structure comprising:
a tube cage comprising a plurality of cooling tubes defining a plurality of chevron-shaped projections, said plurality of chevron-shaped projections coupled together continuously to each said circumferentially-adjacent projection and extending circumferentially about a center axis, each chevron-shaped projection including a first side and a second side coupled together at a tip, circumferentially-adjacent pairs of projections coupled together such that a valley is defined between each said pair of circumferentially-spaced projections, each of said projection tips is positioned radially outward from each of said valleys;
at least one heat transfer panel positioned within said tube cage and formed from a plurality of cooling tubes, said at least one heat transfer panel extends radially inwardly from a tip of one of said chevron-shaped projections towards said center axis; and
a plurality of downcomers spaced radially outward of the circumferentially-spaced projections.

7. A tube structure in accordance with claim 6 wherein each of said tips is defined by at least one cooling tube, each said valley is defined by at least one cooling tube.

8. A tube structure in accordance with claim 6 wherein said first side has a first length, said second side has a second length that is substantially equivalent to said first length.

9. A tube structure in accordance with claim 6 wherein said first side has a first length, and said second side has a second length that is different than said first length.

10. A tube structure in accordance with claim 6 wherein said plurality of downcomers are coupled adjacent each said valley, such that said plurality of downcomers extend generally axially between said first side and said second side of each said pair of circumferentially-spaced projections.

11. A tube structure in accordance with claim 6 wherein said plurality of tubes are aligned at least one of linearly, sinusoidally, and arcuately from each of said tips to each of said valleys.

12. A radiant cooler comprising:
a vessel shell circumferentially-positioned about a center axis at a shell radius; and
a tube cage comprising a plurality of cooling tubes defining a plurality of chevron-shaped projections, said plurality of chevron-shaped projections coupled together continuously to each said circumferentially-adjacent projection and extending circumferentially about a center axis of said tube cage, each chevron-shaped projection including a first and second side coupled together at a tip, circumferentially-adjacent pairs of projections coupled together such that a valley is defined between each said pair of circumferentially-spaced projections;
at least one heat transfer panel positioned within said tube cage and formed from a plurality of cooling tubes, wherein said at least one heat transfer panel extends radially inwardly from a tip of one of said chevron-shaped projections towards said center axis; and
a plurality of downcomers spaced radially outward of the circumferentially-spaced projections.

13. A radiant cooler in accordance with claim 12 wherein said plurality of downcomers are coupled adjacent each said valley, such that said plurality of downcomers extend generally axially between said first side and said second side of each said pair of circumferentially-spaced projections.

14. A radiant cooler in accordance with claim 12 wherein each of said tips is defined by at least one cooling tube, each said valley is defined by at least one cooling tube.

15. A radiant cooler in accordance with claim 12 wherein said plurality of tubes are aligned at least one of linearly, sinusoidally, and arcuately from each of said tips to each of said valleys.

16. A radiant cooler in accordance with claim 12 wherein said first side has a first length, said second side has a second length that is substantially equivalent to said first length.

17. A radiant cooler in accordance with claim 12 wherein said first side has a first length, and said second side has a second length that is different than said first length.

* * * * *